(12) United States Patent
Ayache et al.

(10) Patent No.: US 12,049,953 B2
(45) Date of Patent: Jul. 30, 2024

(54) EPICYCLIC STEP-DOWN GEAR COMPRISING AT LEAST ONE AXIAL FORCE TRANSMISSION COMPONENT WHICH FORMS A RADIALLY ECCENTRIC FORCE PATH

(71) Applicant: HITACHI ASTEMO FRANCE, Drancy (FR)

(72) Inventors: Marc Ayache, Paris (FR); Thierry Pasquet, Vincennes (FR)

( * ) Notice: Subject to any disclaimer, the term of this patent is extended or adjusted under 35 U.S.C. 154(b) by 218 days.

(21) Appl. No.: 17/596,009

(22) PCT Filed: Jun. 2, 2020

(86) PCT No.: PCT/FR2020/050936
§ 371 (c)(1),
(2) Date: Dec. 1, 2021

(87) PCT Pub. No.: WO2020/245534
PCT Pub. Date: Dec. 10, 2020

(65) Prior Publication Data
US 2022/0299105 A1    Sep. 22, 2022

(30) Foreign Application Priority Data

Jun. 4, 2019  (FR) ...................................... 1905918

(51) Int. Cl.
*F16H 57/08* (2006.01)
*F16D 55/226* (2006.01)
(Continued)

(52) U.S. Cl.
CPC ......... *F16H 57/082* (2013.01); *F16D 55/226* (2013.01); *F16D 65/18* (2013.01);
(Continued)

(58) Field of Classification Search
CPC ............ F16H 57/082; F16H 2001/327; F16H 2025/2087; F16H 25/20; F16H 1/32;
(Continued)

(56) References Cited

U.S. PATENT DOCUMENTS 10,247,270 B2 *  4/2019  Nanahara ............ F16H 25/2252
10,626,941 B2 *  4/2020  Sakashita ................ F16D 65/66
(Continued)

FOREIGN PATENT DOCUMENTS

DE   102015214547 A1 *  2/2016  ........... F16D 55/225
FR       3031058 A1       7/2016
(Continued)

OTHER PUBLICATIONS

Specification and drawings for U.S. Appl. No. 17/294,626, filed May 17, 2021.
(Continued)

*Primary Examiner* — Justin Holmes
(74) *Attorney, Agent, or Firm* — Pearne & Gordon LLP

(57) ABSTRACT

An epicyclic step-down gear for an electric parking brake, this step-down gear comprising a drive shaft, at least one step-down stage and a cylinder which forms a screw/nut system with an outer planet gear of this step-down gear. This step-down gear comprises at least one axial force transmission component which is positioned between a bearing ring of the drive shaft and the cylinder so as to transmit axial forces applied via either the bearing ring or the cylinder to either this bearing ring or this cylinder. Such an axial force transmission component prevents the drive shaft from buckling by defining an axial force transmission path which is radially eccentric.

14 Claims, 3 Drawing Sheets

(51) Int. Cl.
   *F16D 65/18*   (2006.01)
   *F16D 121/24*  (2012.01)
   *F16H 1/32*    (2006.01)
   *F16H 25/20*   (2006.01)

(52) U.S. Cl.
   CPC .... *F16D 2121/24* (2013.01); *F16H 2001/327* (2013.01); *F16H 2025/2087* (2013.01)

(58) Field of Classification Search
   CPC ...... F16H 57/023; F16D 55/226; F16D 65/18; F16D 2121/24; F16D 2125/40; F16D 2125/50; F16D 65/095
   See application file for complete search history.

(56) References Cited

U.S. PATENT DOCUMENTS

| | | |
|---|---|---|
| 2010/0084230 A1 | 4/2010 | Yamasaki et al. |
| 2019/0285142 A1* | 9/2019 | Kirchgeßner ............. F16H 1/28 |
| 2020/0102008 A1 | 4/2020 | Pasquet |
| 2020/0114891 A1 | 4/2020 | Pasquet |
| 2020/0361438 A1 | 11/2020 | Pasquet et al. |
| 2022/0010852 A1 | 1/2022 | Bourlon et al. |

FOREIGN PATENT DOCUMENTS

| | | |
|---|---|---|
| JP | S56-140545 A | 11/1981 |
| JP | 2015-198456 A | 11/2015 |
| JP | 2019-049325 A | 3/2019 |
| WO | 2011108450 A1 | 9/2011 |
| WO | 2016107885 A1 | 7/2016 |

OTHER PUBLICATIONS

Specification and drawings for U.S. Appl. No. 17/596,150, filed Dec. 3, 2021.
Search Report for French application No. FR1905918 dated Jan. 20, 2020.
International Search Report for PCT/FR2020/050936 dated Oct. 8, 2020.
Written Opinion for PCT/FR2020/050936 dated Oct. 8, 2020.
Notification of Reasons for Refusal in corresponding Japanese Patent Application No. 2021-572111.

* cited by examiner

EPICYCLIC STEP-DOWN GEAR COMPRISING AT LEAST ONE AXIAL FORCE TRANSMISSION COMPONENT WHICH FORMS A RADIALLY ECCENTRIC FORCE PATH

CROSS-REFERENCE TO RELATED APPLICATIONS

This is a National Stage of PCT international application PCT/EP2020/050936, filed on Jun. 2, 2020, which claims the priority of French Patent Application No. 1905918, filed Jun. 4, 2019, both of which are incorporated herein by reference in their entirety.

TECHNICAL FIELD

The invention relates to an epicyclic reduction gear, for example for an electric parking brake actuator of an automobile vehicle.

BACKGROUND OF THE INVENTION

A conventional floating caliper electric parking brake is disclosed in FR 3 031 058 A1 and in FIG. 1 herein.

In a known manner per se, the brake in FIG. 1 comprises an epicyclic reduction gear the external sun gear of which forms a piston 100 that is translationally movable along a longitudinal axis A100. An input torque generated by an electric motor is transmitted to this piston 100 through a drive shaft 200, represented separately in FIG. 2, and epicyclic gear trains connected in series. An output planet carrier 300 of this reduction gear comprises an external thread which cooperates with an internal thread formed by an internal toothing 400 of the piston 100 so as to transform rotation of the planet carrier 300 into translation of the piston 100 along the longitudinal axis A100, such a translation making it possible to press brake pads against a brake disc by cooperation with fingers 500 of the caliper disposed facing the piston 100.

In this conventional reduction gear, the drive shaft 200 carries a sun gear 600 which meshes with planet gears 700 of a first gear train. The planet carrier 900 of this first gear train carries a sun gear 950 which meshes with planet gears 970 of a second gear train. The drive shaft 200 comprises a downstream part 800 passing through an opening in the planet carrier 900 and the sun gear 950 so that one end of this downstream part 800 is housed in a cavity of the output planet carrier 300 allowing rotation of the shaft 200 relative to the planet carriers 300 and 900 and relative to the sun gear 950.

In this configuration, the application of mechanical forces on the piston 100 during braking leads to a recovery of these forces by the drive shaft 200, which may lead to buckling of this shaft 200.

Disclosure of the Invention

One purpose of the invention is to limit the risk of buckling of the drive shaft of such an epicyclic reduction gear, in particular in order to allow a reduction in its diameter.

More generally, the invention aims at reducing mass and cost of such an epicyclic reduction gear.

To this end, one object of the invention is an epicyclic reduction gear, this reduction gear comprising:

a drive shaft capable of being rotatably driven by a motor about a longitudinal axis, this drive shaft comprising an internal sun gear having said longitudinal axis as its axis of rotation, an external sun gear provided with an internal toothing forming an internal thread, this external sun gear being rotatably fixed about the longitudinal axis, a gear comprising one or more planet carriers and one or more planet gears carried by this or these planet carrier(s), a cylinder configured to be rotatably driven about the longitudinal axis by said gear upon rotating the drive shaft about this longitudinal axis, this cylinder comprising an external thread cooperating with the internal thread of the external sun gear so that rotation of this cylinder about the longitudinal axis translationally drives the external sun gear along this longitudinal axis.

According to the invention, the drive shaft comprises a shoulder forming a bearing ring radially outwardly of the internal sun gear, and the reduction gear comprises at least one axial force transmission piece interposed between this bearing ring and the cylinder so as to transmit axial forces exerted on one of the bearing ring and the cylinder to the other of this bearing ring and this cylinder.

The at least one transmission part makes it possible to recover some exerted axial forces to which the reduction gear is subjected, for example during braking when the reduction gear belongs to a brake actuator, so as to relieve the drive shaft.

The invention thus makes it possible to reduce mass and cost of this reduction gear, relative to a conventional reduction gear, in particular by reducing the diameter of the parts of the drive shaft which are adjacent to the bearing ring of this shaft.

In one embodiment, the at least one axial force transmission piece may bear on the one hand against said bearing ring, preferably through a friction washer, and on the other hand against one of the planet carrier(s) of the gear.

In one embodiment, the at least one axial force transmission piece may comprise one or more radial openings, each of these radial openings forming a housing for a respective planet gear of the gear.

In one embodiment, the at least one axial force transmission piece may comprise arms defining said radial openings therebetween.

In one embodiment, the gear may comprise first and second planet carriers, the reduction gear comprising a first axial force transmission piece interposed between the bearing ring and the first planet carrier so as to transmit axial forces exerted on one of the bearing ring and the first planet carrier to the other of this bearing ring and this first planet carrier, the second planet carrier forming a second axial force transmission piece interposed between the first planet carrier and the cylinder so as to transmit axial forces exerted on one of the first planet carrier and the cylinder to the other of this first planet carrier and this cylinder.

In one embodiment, the reduction gear may comprise a ring gear rotatably integral with the external sun gear about the longitudinal axis, and the second planet carrier may form a free cage carrying planet gears which mesh with both an internal toothing of the ring gear and an internal toothing of the cylinder, the internal toothing of the ring gear comprising a number of teeth different from the number of teeth of the internal toothing of the cylinder.

In one embodiment, said second axial force transmission piece may bear on the one hand against the first planet carrier, preferably through a friction washer, and on the other hand against a bearing face of the cylinder, preferably through a friction washer.

Another object of the invention is an electric brake actuator, this actuator comprising a reduction gear as defined above and an electric motor configured to rotatably drive said drive shaft about said longitudinal axis.

Another object of the invention is a disc brake, preferably a floating caliper brake, such as a parking brake or a service brake, this brake comprising an actuator as defined above.

Another object of the invention is an automobile vehicle, comprising a disc brake as defined above.

Further advantages and characteristics of the invention will become apparent from the following detailed, non-limiting description.

BRIEF DESCRIPTION OF THE DRAWINGS

The following detailed description refers to the attached drawings in which.

DETAILED DESCRIPTION OF EMBODIMENTS

Figure 1:
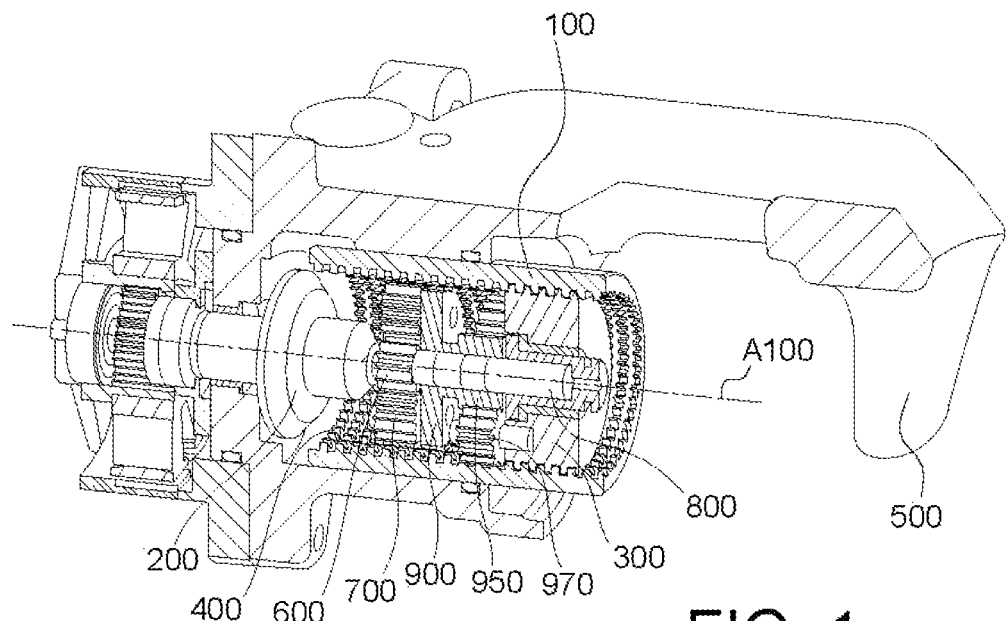
FIG. 1 is a partial schematic perspective in longitudinal cross-section view of an electric parking brake comprising an epicyclic reduction gear of known type.
Figure 2:
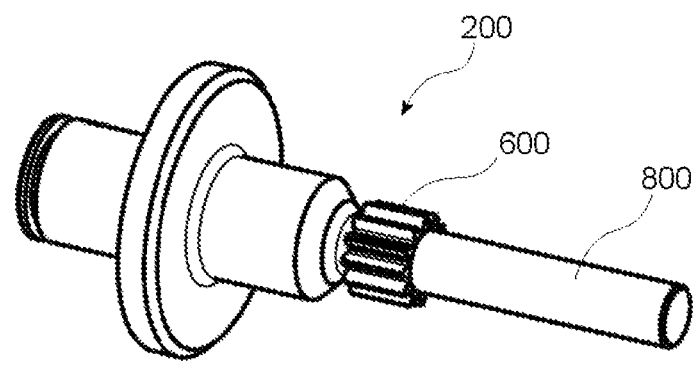
FIG. 2 is a schematic perspective view of a drive shaft of the reduction gear of the brake of FIG. 1.
Figure 3:
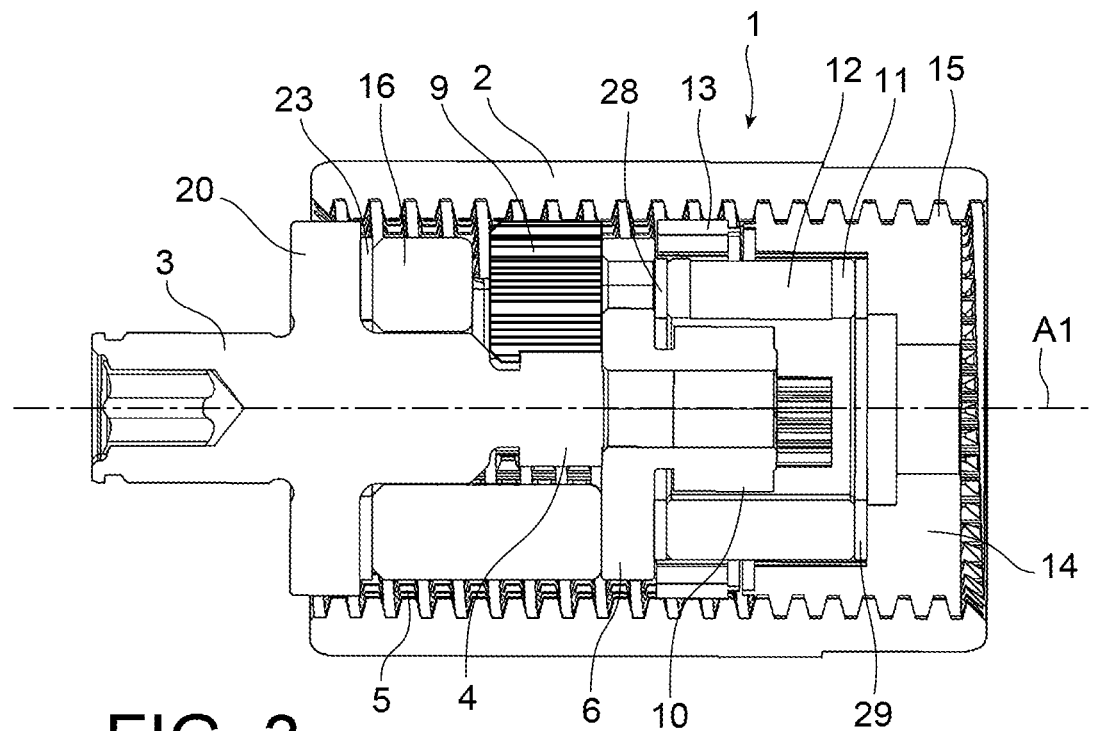
FIG. 3 is a partial schematic longitudinal cross-section view of an epicyclic reduction gear according to the invention.
Figure 5:
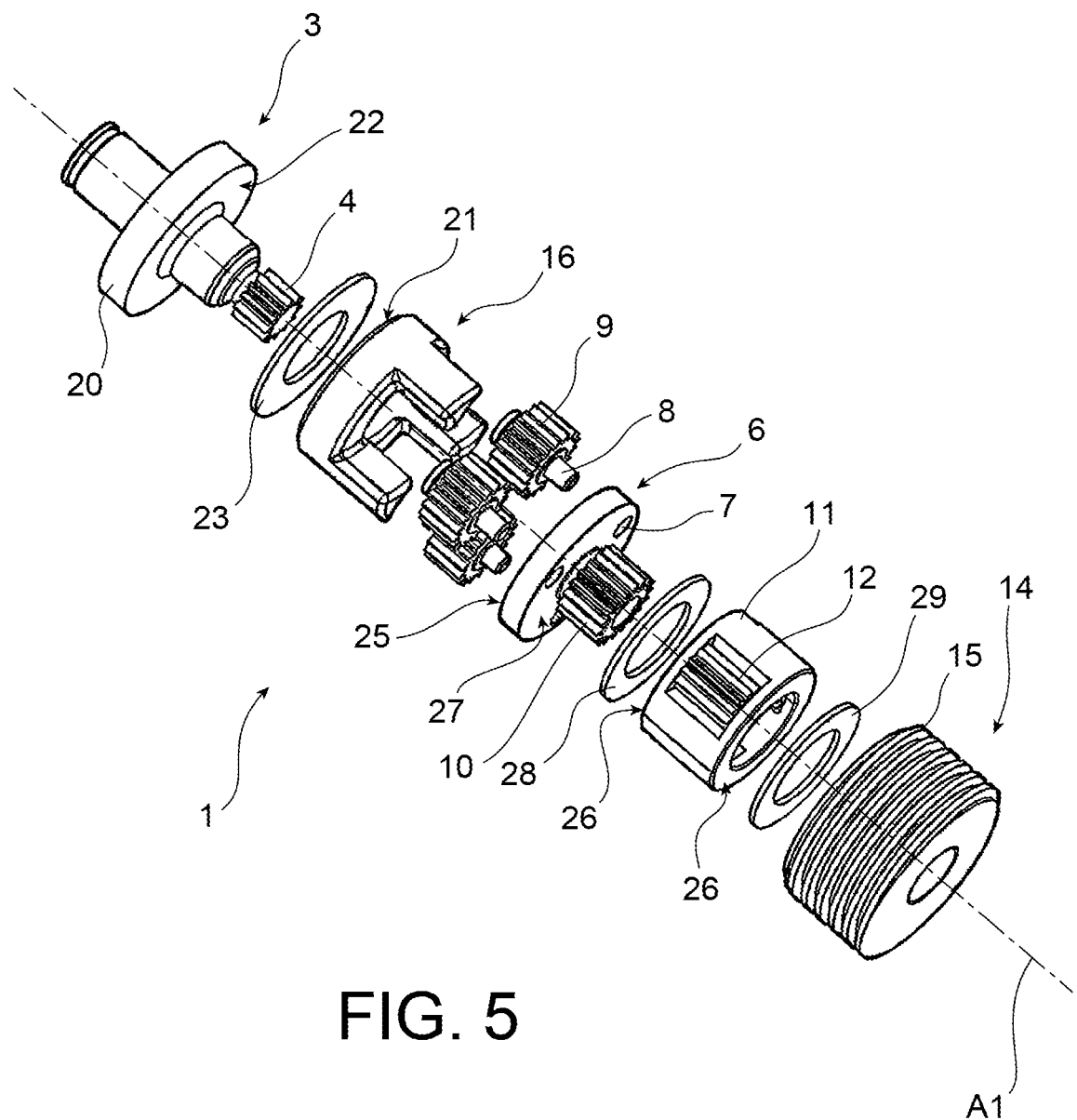
FIG. 5 is a schematic perspective and exploded view of a part of the reduction gear of FIG. 3.

FIGS. 3 and 5 show an epicyclic reduction gear 1 according to the invention. This reduction gear 1 can be used in the automotive field, for example in an electric brake fitted to a disc brake, in particular of the floating caliper type, or more generally in an electromechanical actuator for transforming a rotational movement into a translational movement.

With reference to FIG. 3, the reduction gear 1 comprises an external sun gear 2 forming a piston translationally movable along a longitudinal axis A1. This piston 2 is rotatably stationary about this longitudinal axis A1 by any conventional means, for example by inserting pins—for example belonging to a brake caliper—into corresponding notches made in the piston 2.

The translational displacement of the piston 2 along the longitudinal axis A1 is generated by an electric motor (not represented) which transmits an input torque to a drive shaft 3 of the reduction gear 1. The rotational movement of this shaft 3 about the axis A1 is transformed into translational movement of the piston 2 via a gear and a movement transformation member as described below.

More specifically, the drive shaft 3 is in this example adapted to be connected to an electric motor so as to be rotatably driven about the axis A1 when a shaft of the motor rotates about this axis A1.

The drive shaft 3 is provided with a first internal sun gear 4 which is rotatably integral with this shaft 3 about the axis A1. In this example, the sun gear 4 is formed as a single piece with the shaft 3.

The external sun gear 2 comprises an internal toothing 5 forming, on the one hand, circumferentially spaced apart longitudinal grooves for meshing with planet gears and, on the other hand, an internal thread configured to cooperate with an external thread of said movement transformation member (see later).

The reduction gear 1 comprises a first planet carrier 6 having three openings 7 eccentric to the axis A1 at 120°, each of these openings 7 receiving a journal 8 carrying a respective planet gear 9 so as to ensure rotational guidance of this planet gear 9 (see FIG. 5).

The planet gears 9 mesh both with the first internal sun gear 4 and with said longitudinal grooves formed by the internal toothing 5 of the external sun gear 2 so that rotation about the axis A1 of the shaft 3 and therefore of the sun gear 4 rotatably drives each planet gear 9 on the one hand about its journal 8 and on the other hand along a circumferential trajectory about the axis A1, hence rotatably driving the first planet carrier 6 about the axis A1.

The reduction gear 1 thus enables the first planet carrier 6 to be rotatably driven about the longitudinal axis A1 at a lower speed of rotation than the speed of rotation of the drive shaft 3.

In the example in FIGS. 3 and 5, the reduction gear 1 comprises a second reduction stage, the input of which consists of a second internal sun gear 10 carried by the first planet carrier 6, this sun gear 10 being rotatably integral with the planet carrier 6 about the axis A1. In this example, the sun gear 10 is formed as a single piece with the planet carrier 6.

The reduction gear 1 of FIGS. 3 and 5 comprises a second planet carrier 11 forming a free cage carrying in this example three planet gears 12. In a known manner per se, the cage 11 has a substantially tubular shape and is provided with radial openings which each extend over a central axial portion so that each radial opening is axially delimited, on either side, by a respective axial end portion of the cage. Each of these radial openings forms a housing for one of the planet gears 12. In order to carry the planet gears 12 and ensure their rotational guidance, a respective shaft which is connected to the cage by being received in a corresponding hole in each of the axial end portions of the cage axially passes through each opening respectively.

With reference to FIG. 3, the reduction gear 1 comprises a ring gear 13 comprising external teeth and internal teeth, the external teeth being engaged in said longitudinal grooves formed by the internal toothing 5 of the external sun gear 2 so that the ring gear 13 and the external sun gear 2 are rotatably integral with each other about the axis A1. The internal teeth of the ring gear 13 are configured to mesh with the planet gears 12 by defining contact points located radially inwardly with respect to the internal toothing 5 of the external sun gear 2. In other words, the internal teeth of the ring gear 13 are configured to offset the longitudinal grooves formed by the internal toothing 5 of the external sun gear 2 radially inwardly of the reduction gear 1.

In this example, this radial offset is necessitated by the fact that the planet gears 12 also mesh with teeth formed in a cavity of the movement transformation member 14, this cavity having a radial dimension smaller than the radial inner dimension of the external sun gear 2 (see FIG. 3, and hereafter).

In this example, the movement transformation member 14 takes the form of a cylinder with an external thread 15 which cooperates with the internal thread formed by the internal toothing 5 of the external sun gear 2. As a result of this cooperation, a rotational displacement of the cylinder 14 about the axis A1 leads to a translational displacement of the external sun gear 2 along the axis A1. The cylinder 14 and the piston 2 thus form a reversible screw-nut system.

Said cavity of the cylinder 14 is configured to receive part of the cage 11 so that the planet gears 12 mesh with the teeth formed in this cavity by a first axial part thereof.

The ring gear 13 is axially adjacent to the cylinder 14 so that the planet gears 12 mesh with a second axial part thereof with the internal teeth of the ring gear 13.

By virtue of such a configuration, the rotation of the sun gear 10 about the axis A1, on the one hand rotatably drives each planet gear 12 about its own axis of rotation and on the other hand along a circumferential trajectory about the axis A1, consequently rotatably driving the free cage 11 about the axis A1.

If the number of internal teeth of the ring gear 13 were identical to the number of teeth formed in the cavity of the cylinder 14, rotation of the sun gear 10 about the axis A1 would not rotatably drive the cylinder 14 about this axis A1. Indeed, the teeth of the cylinder 14 would in this case be axially aligned with the internal teeth of the ring gear 13 so that the planet gears 12 would simply roll in the toothing of the cylinder 14 when rotated.

In this example, the ring gear 13 consequently has a number of internal teeth smaller than the number of teeth formed in the cavity of the cylinder 14, thereby achieving a relatively high rate of speed reduction.

The reduction gear 1 thus enables the cylinder 14 to be rotatably driven about the longitudinal axis A1 at a lower speed of rotation than the speed of rotation of the sun gear 10 and even more so the drive shaft 3.

The reduction gear 1 thus reduces the speed of rotation by increasing torque.

The invention makes it possible to recover axial forces applied in this reduction gear 1, for example when the piston 2 exerts a braking force.

Figure 4:
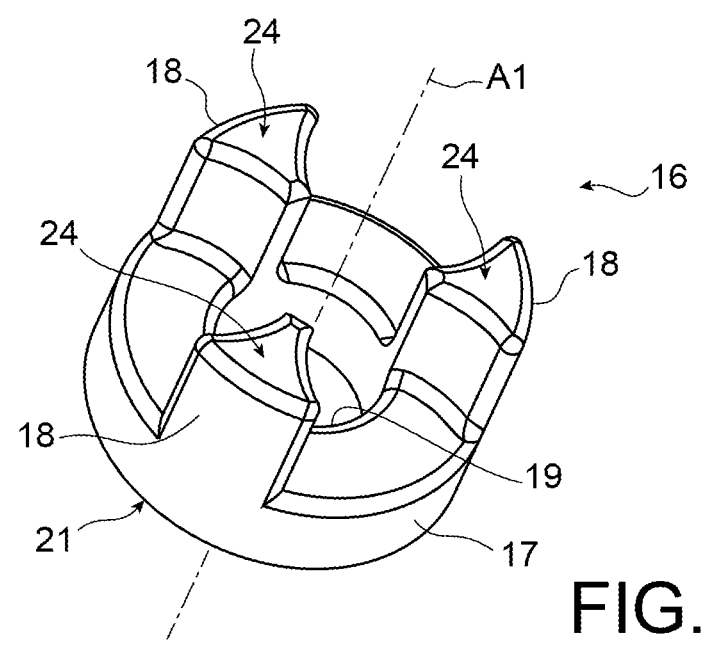
FIG. 4 is a schematic perspective view of an axial force transmission piece of the reduction gear of FIG. 3.

To this end, the reduction gear 1 comprises a force transmission piece 16 as represented in FIG. 4.

In this example, the piece 16 has a substantially tubular shape defining a central opening 19 dimensioned so that the drive shaft 3 passes therethrough and to allow a relative rotation of the shaft 3 with respect to this piece 16.

In this embodiment, the force transmission piece 16 comprises an annular circumferentially solid first part 17, and a second part comprising three arms 18 extending axially and defining radial openings therebetween, each forming a housing for a respective planet gear 9.

In order to provide force recovery, the drive shaft 3 comprises a shoulder 20 forming a bearing ring radially outwardly of the internal sun gear 4.

The piece 16 is interposed between this bearing ring formed by the shoulder 20 of the shaft 3 and the planet carrier 6 so as to transmit axial forces exerted on the planet carrier 6 to the bearing ring 20, or from the bearing ring 20 to the planet carrier 6, while preventing these axial forces from transiting through the radially central part of the shaft 3, in particular the part of the shaft 3 located axially on either side of the shoulder 20. As a result, the risk of buckling of the drive shaft 3 when using the reduction gear 1 is significantly reduced or eliminated.

More precisely, said first part 17 of the force transmission piece 16 forms a bearing face 21 which bears against a bearing face 22 formed by the bearing ring 20, through a friction washer 23. The axial arms 18 of the force transmission piece 16 define a bearing face 24 which bears against a bearing face 25 of the planet carrier 6.

The friction washer 23 makes it possible to limit wear of the bearing ring 20 and of the force transmission piece 16 when relatively rotating these pieces with respect to each other.

Furthermore, said axial end portions of the free cage 11 each form a bearing face 26, one bearing against a bearing face 27 of the planet carrier 6, through a friction washer 28, the other bearing against a bearing face formed by the bottom of said cavity of the cylinder 14, through a friction washer 29.

The free cage 11, interposed between the planet carrier 6 and the cylinder 14, thus forms a second axial force transmission piece enabling axial forces exerted on the cylinder 14 to be transmitted to the planet carrier 6, or conversely enabling axial forces exerted on the planet carrier 6 to be transmitted to the cylinder 14.

The friction washers 28 and 29 makes it possible to limit wear of the planet carrier 6, the free cage 11 and the member 14 when relatively rotating these pieces with respect to each other.

The embodiment of FIG. 3 thus makes it possible to transmit axial forces exerted on the cylinder 14—for example when the piston 2 is subjected to a braking force—to the bearing ring 20 through two axial force transmission pieces 11 and 16 interposed between the bearing ring 20 and the cylinder 14, while preventing path of these axial forces from passing through the longitudinal axis A1 and therefore through the parts of the drive shaft 3 with a relatively small diameter as compared to the diameter of its shoulder 20. This force transmission function via an eccentric force path is also ensured in the other direction, that-is when axial forces are applied to the bearing ring 20. In the latter case, the two axial force transmission pieces 11 and 16 enable axial forces applied to the bearing ring 20 to be transmitted to the cylinder 14.

The foregoing description is given by way of example and is by no means limiting. For example, in embodiments not represented, the reduction gear 1 may comprise a single reduction stage. In this case, the planet carrier 6 does not comprise the second internal sun gear 10, and is directly connected to the cylinder 14 so that the cylinder 14 and the planet carrier 6 are rotatably integral with each other about the axis A1. Of course, the reduction gear 1 does not include the free cage 11, the planet gears 12 and the friction washers 28 and 29 in such a single-stage reduction embodiment.

In a further embodiment not represented, the reduction gear 1 comprises a second reduction stage different from that given as an example in FIG. 3. For example, the planet gears 12 are not carried by the free cage 11 but directly by the member 14. In order to ensure recovery of the axial forces between the planet carrier 6 and this member 14, the reduction gear 1 may in this case comprise an additional axial force transmission piece similar to piece 16 and interposed between the planet carrier 6 and the member 14.

NOMENCLATURE

A100 longitudinal axis
100 external sun gear/piston
200 drive shaft
300 output planet carrier
400 internal toothing of the external sun gear
500 caliper fingers
600 sun gear
700 planet gears
800 downstream part of the drive shaft
900 planet carrier of first gear train
A1 longitudinal axis
1 epicyclic reduction gear
2 external sun gear/piston
3 drive shaft 4 first internal sun gear
5 internal toothing of the external sun gear
6 first planet carrier
7 openings for journals of first planet carrier
8 journals of first planet carrier
9 planet gears of first planet carrier
10 second internal sun gear
11 second planet carrier/free cage/second axial force transmission piece
12 planet gears of second planet carrier
13 ring gear
14 cylinder/movement transformation member/screw
15 External thread of the cylinder
16 (first) axial force transmission piece
17 first part/solid part of the axial force transmission piece
18 second part/arm of the axial force transmission piece
19 central opening of the axial force transmission piece
20 shoulder/bearing ring of the drive shaft
21 bearing face of the axial force transmission piece
22 bearing face of the bearing ring
23 friction washer
24 bearing face of the axial force transmission piece
25 bearing face of the first planet carrier
26 bearing faces of the second planet carrier
27 bearing face of the first planet carrier
28 friction washer
29 friction washer

What is claimed is:

1. An epicyclic reduction gear comprising:
a drive shaft configured to be rotatably driven by a motor about a longitudinal axis, this drive shaft comprising an internal sun gear configured to rotate about said longitudinal axis,
an external sun gear provided with an internal toothing forming an internal thread, wherein this external sun gear is rotatably fixed about the longitudinal axis of the motor,
a gear comprising one or more planet carriers and one or more planet gears carried by this or these planet carriers,
a cylinder configured to be rotatably driven about the longitudinal axis by said gear during rotation of the drive shaft about this longitudinal axis, wherein the cylinder comprises an external thread cooperating with the internal thread of the external sun gear so that rotation of this cylinder about the longitudinal axis translationally drives the external sun gear along this longitudinal axis, wherein the drive shaft comprises a shoulder forming a bearing ring radially outwardly of the internal sun gear, and wherein the reduction gear comprises at least one axial force transmission piece interposed between this bearing ring and the cylinder so as to transmit axial forces exerted on one of the bearing ring and the cylinder to the other of this bearing ring and this cylinder.

2. The reduction gear according to claim 1, wherein the at least one axial force transmission piece bears on the one hand against said bearing ring and on the other hand against the at least one planet carrier(s) of the gear.

3. The reduction gear according to claim 2, wherein the at least one axial force transmission piece bears on the one hand against said bearing ring through a friction washer, and on the other hand against the at least one planet carrier(s) of the gear.

4. The reduction gear according to claim 1, wherein the at least one axial force transmission piece comprises one or more radial openings, wherein each of these radial openings form a housing for a respective planet gear of the gear.

5. The reduction gear according to claim 4, wherein the at least one axial force transmission piece comprises arms defining said radial openings therebetween.

6. The reduction gear according to claim 1, wherein the gear comprises a first and a second planet carrier, wherein the reduction gear comprises a first axial force transmission piece interposed between the bearing ring and the first planet carrier so as to transmit axial forces exerted on one of the bearing ring and the first carrier to the other of this bearing ring and this first planet carrier, wherein the second planet carrier forms a second axial force transmission piece interposed between the first planet carrier and the cylinder so as to transmit axial forces exerted on one of the first planet carrier and the cylinder to the other of this first planet carrier and this cylinder.

7. The reduction gear according to claim 6, comprising a ring gear rotatably integral with the external sun gear about the longitudinal axis, and wherein the second planet carrier forms a free cage carrying planet gears which mesh both with an internal toothing of the ring gear and with an internal toothing of the cylinder, wherein the internal toothing of the ring gear comprises a number of teeth different from the number of teeth of the internal toothing of the cylinder.

8. The reduction gear according to claim 6, wherein said second axial force transmission piece bears on the one hand against the first planet carrier and on the other hand against a bearing face of the cylinder.

9. The reduction gear according to claim 8, wherein said second axial force transmission piece bears on the one hand against the first planet carrier through a friction washer, and on the other hand against a bearing face of the cylinder.

10. The reduction gear according to claim 8, wherein said second axial force transmission piece bears on the one hand against the first planet carrier, and on the other hand against a bearing face of the cylinder through a friction washer.

11. An electric brake actuator, comprising a reduction gear according to claim 1 and an electric motor configured to rotatably drive said drive shaft about said longitudinal axis.

12. A disc brake, comprising an electric brake actuator according to claim 11.

13. An automobile vehicle, comprising the disc brake according to claim 12.

14. The disc brake of claim 12, wherein the disc brake is a floating caliper brake.

* * * * *